(12) United States Patent
Kursun et al.

(10) Patent No.: US 11,610,110 B2
(45) Date of Patent: Mar. 21, 2023

(54) DE-CONFLICTING DATA LABELING IN REAL TIME DEEP LEARNING SYSTEMS

(71) Applicant: BANK OF AMERICA CORPORATION, Charlotte, NC (US)

(72) Inventors: Eren Kursun, New York, NY (US); William David Kahn, Weddington, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 909 days.

(21) Appl. No.: 16/210,584

(22) Filed: Dec. 5, 2018

(65) Prior Publication Data

US 2020/0184326 A1 Jun. 11, 2020

(51) Int. Cl.
  G06N 3/08 (2023.01)
  G06N 3/04 (2023.01)
  G06N 3/042 (2023.01)
(52) U.S. Cl.
  CPC .............. *G06N 3/08* (2013.01); *G06N 3/042* (2023.01)
(58) Field of Classification Search
  CPC ................................ G06N 3/042; G06N 3/08
  See application file for complete search history.

(56) References Cited

U.S. PATENT DOCUMENTS

| | | |
|---|---|---|
| 5,592,589 A | 1/1997 | Poon |
| 7,849,032 B1 | 12/2010 | Campos et al. |
| 8,768,870 B1 | 7/2014 | Corrado et al. |
| 9,935,831 B1 | 4/2018 | Wundsam et al. |
| 9,984,337 B2 | 5/2018 | Kadav et al. |

(Continued)

FOREIGN PATENT DOCUMENTS

| | | |
|---|---|---|
| CN | 105868572 A | 8/2016 |
| WO | 2017106645 A1 | 6/2017 |

(Continued)

OTHER PUBLICATIONS

Yu et. al., "Learning with heterogenous data sets by weighted multiple kernel canonical correlation analysis", 2007 (Year: 2007).*

*Primary Examiner* — Omar F Fernandez Rivas
*Assistant Examiner* — Selene A. Haedi
(74) *Attorney, Agent, or Firm* — Moore & Van Allen PLLC; Anup Shrinivasan Iyer

(57) ABSTRACT

Systems, computer program products, and methods are described herein for de-conflicting data labeling in real-time deep learning systems. The present invention is configured to retrieve one or more dynamically generated expert profiles; and determine an optimal expert mix of experts to classify the transaction into a transaction types, wherein the expert profiles comprises: (i) shared information metrics, (ii) divergence metrics, (iii) characteristics associated with the one or more experts, (iv) a predictive accuracy of the one or more experts, (v) an exposure score associated with the one or more experts, and (vi) information associated with the transaction, wherein the optimal expert mix comprises: (i) a best expert for classifying the transaction, (ii) a combination score from at least the portion of the one or more experts evaluating the transaction simultaneously, and (iii) a sequence of at least the portion of the one or more experts analyzing the transaction.

16 Claims, 4 Drawing Sheets

(56) References Cited

U.S. PATENT DOCUMENTS

| | | | |
|---|---|---|---|
| 10,117,597 B2 | 11/2018 | Beckers et al. | |
| 10,181,320 B2 | 1/2019 | Chen et al. | |
| 10,460,320 B1* | 10/2019 | Cao | G06N 20/00 |
| 2008/0005736 A1 | 1/2008 | Apacible et al. | |
| 2008/0163094 A1 | 7/2008 | Pannese et al. | |
| 2010/0253967 A1* | 10/2010 | Privault | G06K 9/6217 |
| | | | 358/1.15 |
| 2010/0299301 A1* | 11/2010 | Busch | G06N 5/02 |
| | | | 706/46 |
| 2010/0306141 A1* | 12/2010 | Chidlovskii | G06N 20/00 |
| | | | 706/13 |
| 2014/0143194 A1 | 5/2014 | Yoon et al. | |
| 2014/0188446 A1 | 7/2014 | Kimura | |
| 2014/0365517 A1* | 12/2014 | Calo | G06F 16/243 |
| | | | 707/760 |
| 2015/0079565 A1* | 3/2015 | Miller | G09B 23/30 |
| | | | 434/262 |
| 2015/0254555 A1* | 9/2015 | Williams, Jr. | G06N 3/0454 |
| | | | 706/14 |
| 2016/0086078 A1 | 3/2016 | Ji et al. | |
| 2016/0092765 A1 | 3/2016 | Chilimbi et al. | |
| 2016/0335795 A1 | 11/2016 | Flynn et al. | |
| 2017/0083797 A1 | 3/2017 | Kumar et al. | |
| 2017/0124487 A1* | 5/2017 | Szeto | G06N 20/00 |
| 2019/0155947 A1* | 5/2019 | Chu | G06N 20/00 |
| 2020/0175421 A1* | 6/2020 | Zhou | G06N 20/10 |

FOREIGN PATENT DOCUMENTS

| | | |
|---|---|---|
| WO | 2017128961 A1 | 8/2017 |
| WO | 2017132428 A1 | 8/2017 |
| WO | 2017167044 A1 | 10/2017 |
| WO | 2017213857 A1 | 12/2017 |
| WO | 2018057302 A1 | 3/2018 |
| WO | 2018154494 A1 | 8/2018 |

* cited by examiner

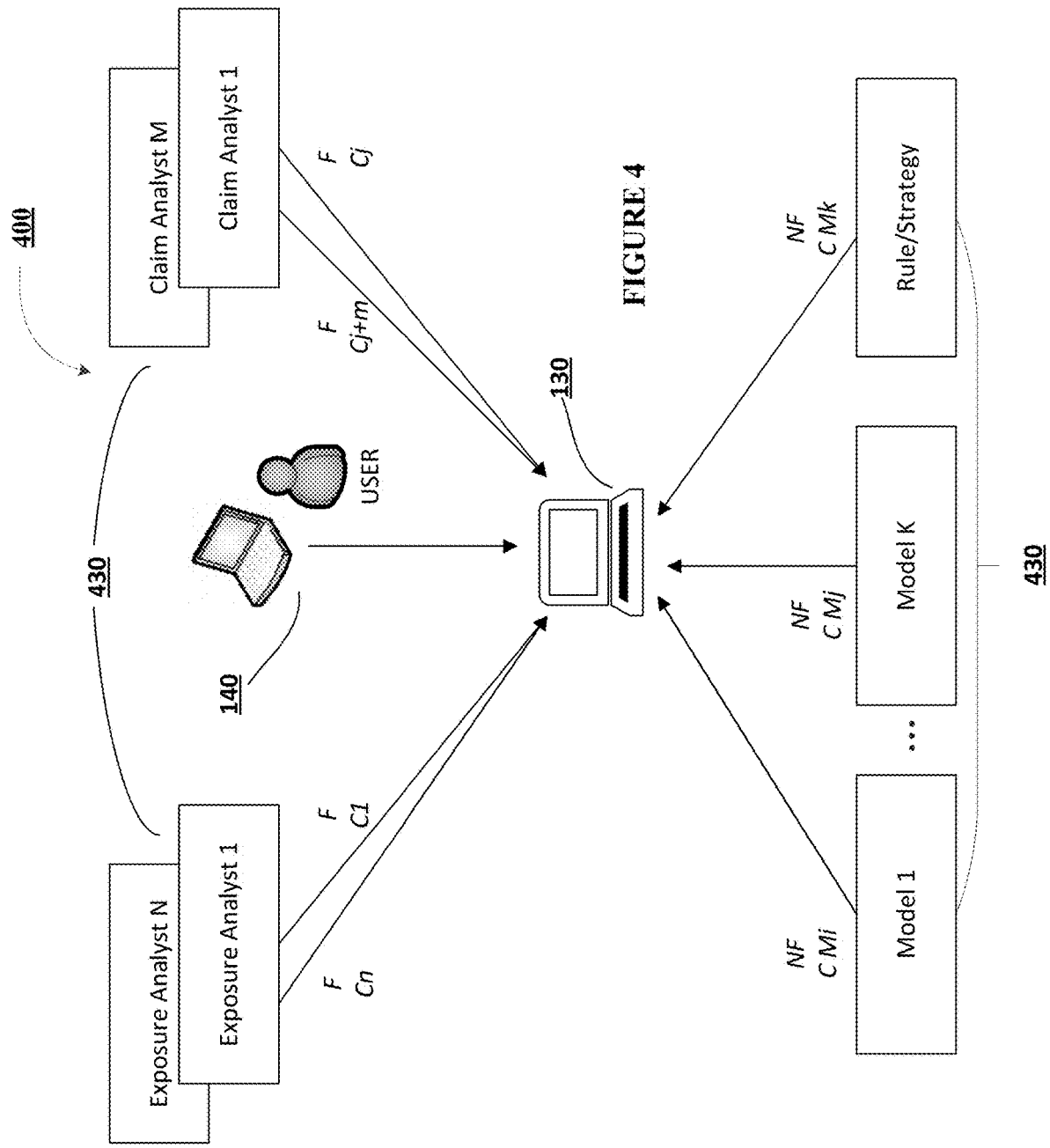

DE-CONFLICTING DATA LABELING IN REAL TIME DEEP LEARNING SYSTEMS

FIELD OF THE INVENTION

The present invention embraces a system for de-conflicting data labeling in real time deep learning systems.

BACKGROUND

Classification techniques, specifically, supervised classification techniques involves the machine learning task of learning a function that maps an input to an output based on example input-output pairs. In this technique, both input and desired output data are labelled manually, by analysts, for classification to provide a learning basis for future data processing. However, in deep learning systems that rely on accurate class labels for training datasets, any conflicts in data labeling may perpetuate throughout the learning and prediction process. There is a need for an optimization system to improve the selection of analysts involved in the class labelling process for improved performance in deep learning systems.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for conflicting data labeling in real-time deep learning systems is presented. The system comprising: at least one non-transitory storage device; and at least one processing device coupled to the at least one non-transitory storage device, wherein the at least one processing device is configured to: electronically receive, via a first user computing device, a transaction, wherein the transaction is associated with one or more transaction types; retrieve from a first database, one or more dynamically generated expert profiles associated with one or more experts, wherein dynamically generating the one or more expert profiles comprises: retrieving expert labelling data from one or more experts; initiating one or more machine learning algorithms on the expert labelling data; determining, based on at least the one or more machine learning algorithms, an estimated label of the transaction associated with each of the one or more experts; and storing the estimated label of the transaction associated with each of the one or more experts; and determine an optimal expert mix of at least a portion of the one or more experts to classify the transaction into at least one of the one or more transaction types based on at least the one or more expert profiles.

In some embodiments, the at least one processing device is further configured to implement one or more optimization algorithms on the one or more expert profiles to determine an optimal expert mix of at least the portion of the one or more experts, wherein determining further comprises maximizing a probability of accurately classifying the transaction into at least one of the one or more transaction types.

In some embodiments, the at least one processing device is further configured to: determine one or more weights associated with at least the portion of the one or more experts; receive one or more classification labels from at least the portion of the one or more experts to classify the transaction; apply the one or more weights to each of the one or more classification labels received from at least the portion of the one or more experts; and determine the classification label to classify the transaction into at least one of the one or more transaction types based on at least a weighted function of the one or more classification labels received from at least the portion of the one or more experts.

In some embodiments, the weighted function comprises a canonical correlation analysis to determine a linear combination of the one or more weights and the one or more classification labels received from at least the portion of the one or more experts which have maximum correlation with each other.

In some embodiments, the at least one processing device is further configured to determine the success rate of each of the one or more experts, wherein determining further comprises: electronically receive one or more historical transactions, wherein the one or more historical transactions is associated with the one or more transaction types; electronically receive from the one or more experts, one or more historical classification labels associated with the one or more historical transactions classifying the one or more historical transactions into at least one of the one or more transaction types; determine one or more true classification labels indicating a ground truth associated with the one or more historical transactions; compare the one or more true classification labels with the one or more historical classification labels received from the one or more experts to determine a match; and determine the success rate of each of the one or more experts based on at least based on at least comparing the one or more true classification labels with the one or more historical classification labels.

In some embodiments, the at least one processing device is further configured to: transfer control signals configured to initiate one or more reporting subroutines on the one or more historical transactions, the one or more historical classification labels associated with the one or more historical transactions received from the one or more experts, at least one of the one or more transaction types associated with the one or more historical transactions, and the success rate of each of the one or more experts at accurately classifying the one or more historical classification labels; and generate, using the one or more reporting subroutines, one or more dashboards comprising a graphical representation indicating a first portion of the one or more historical transactions accurately classified by the one or more experts and a second portion of the one or more historical transactions misclassified by the one or more experts.

In some embodiments, the one or more expert profiles comprises: (i) shared information metrics, (ii) divergence metrics, (iii) characteristics associated with the one or more experts, (iv) a predictive accuracy of the one or more experts based on a success rate of the one or more experts at classifying the transaction, (v) an exposure score associated with the one or more experts, and (vi) information associated with the transaction.

In some embodiments, the at least one processing device is further configured to update the one or more expert profiles in real-time, wherein updating further comprises updating the success rate of each of the one or more experts at classifying the one or more historical classification labels.

In some embodiments, updating the one or more expert profiles in real-time further comprises: continuously determining whether the one or more classification labels received from the one or more experts matches a ground truth associated with one or more future transactions incrementally; and updating the success rate of each of the one or more experts at classifying the one or more future transactions.

In some embodiments, the one or more transaction types comprises at least a valid transaction and an unauthorized transaction, and wherein the unauthorized transaction comprises one or more unauthorized transaction types.

In some embodiments, the one or more experts comprises one or more machine learning models, one or more human analysts, a customer feedback, and/or one or more external data sources.

In another aspect, a computer implemented method for de-conflicting data labeling in real-time deep learning systems is presented. The method comprising: electronically receiving, via a first user computing device, a transaction, wherein the transaction is associated with one or more transaction types; retrieving from a first database, one or more dynamically generated expert profiles associated with one or more experts, wherein dynamically generating the one or more expert profiles comprises: retrieving expert labelling data from one or more experts; initiating one or more machine learning algorithms on the expert labelling data; determining, based on at least the one or more machine learning algorithms, an estimated label of the transaction associated with each of the one or more experts; and storing the estimated label of the transaction associated with each of the one or more experts; and determining an optimal expert mix of at least a portion of the one or more experts to classify the transaction into at least one of the one or more transaction types based on at least the one or more expert profiles.

In yet another aspect, a computer program product for de-conflicting data labeling in real-time deep learning systems is presented. The computer program product comprising a non-transitory computer-readable medium comprising code causing an apparatus to: electronically receive, via a first user computing device, a transaction, wherein the transaction is associated with one or more transaction types; retrieve from a first database, one or more dynamically generated expert profiles associated with one or more experts, wherein dynamically generating the one or more expert profiles comprises: retrieving expert labelling data from one or more experts; initiating one or more machine learning algorithms on the expert labelling data; determining, based on at least the one or more machine learning algorithms, an estimated label of the transaction associated with each of the one or more experts; and storing the estimated label of the transaction associated with each of the one or more experts; and determine an optimal expert mix of at least a portion of the one or more experts to classify the transaction into at least one of the one or more transaction types based on at least the one or more expert profiles.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
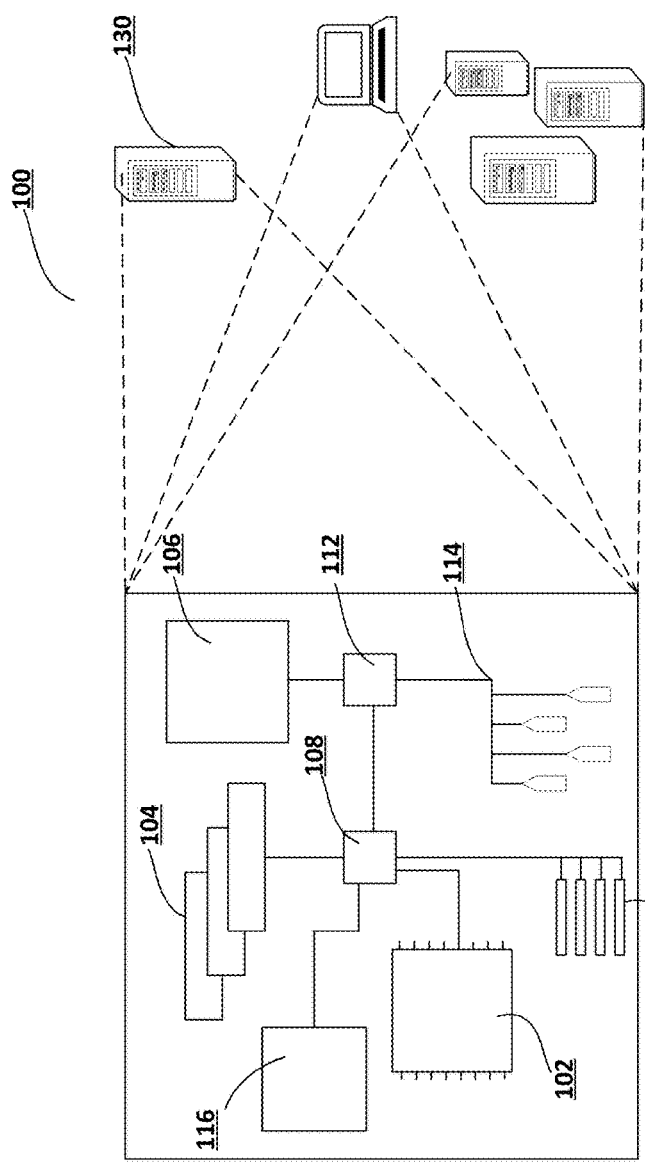
Figure 1:
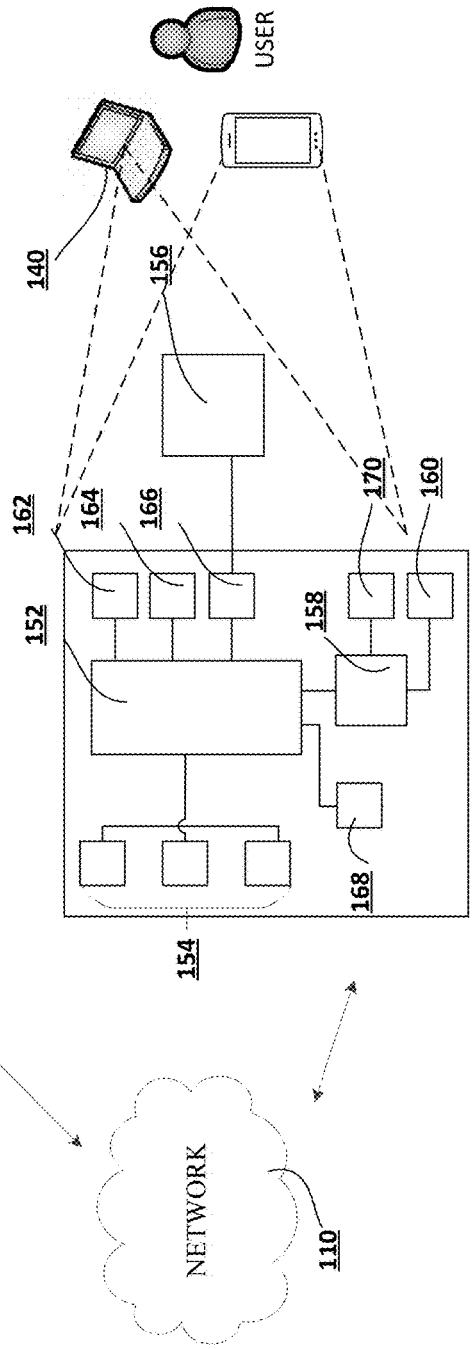
Figure 2:
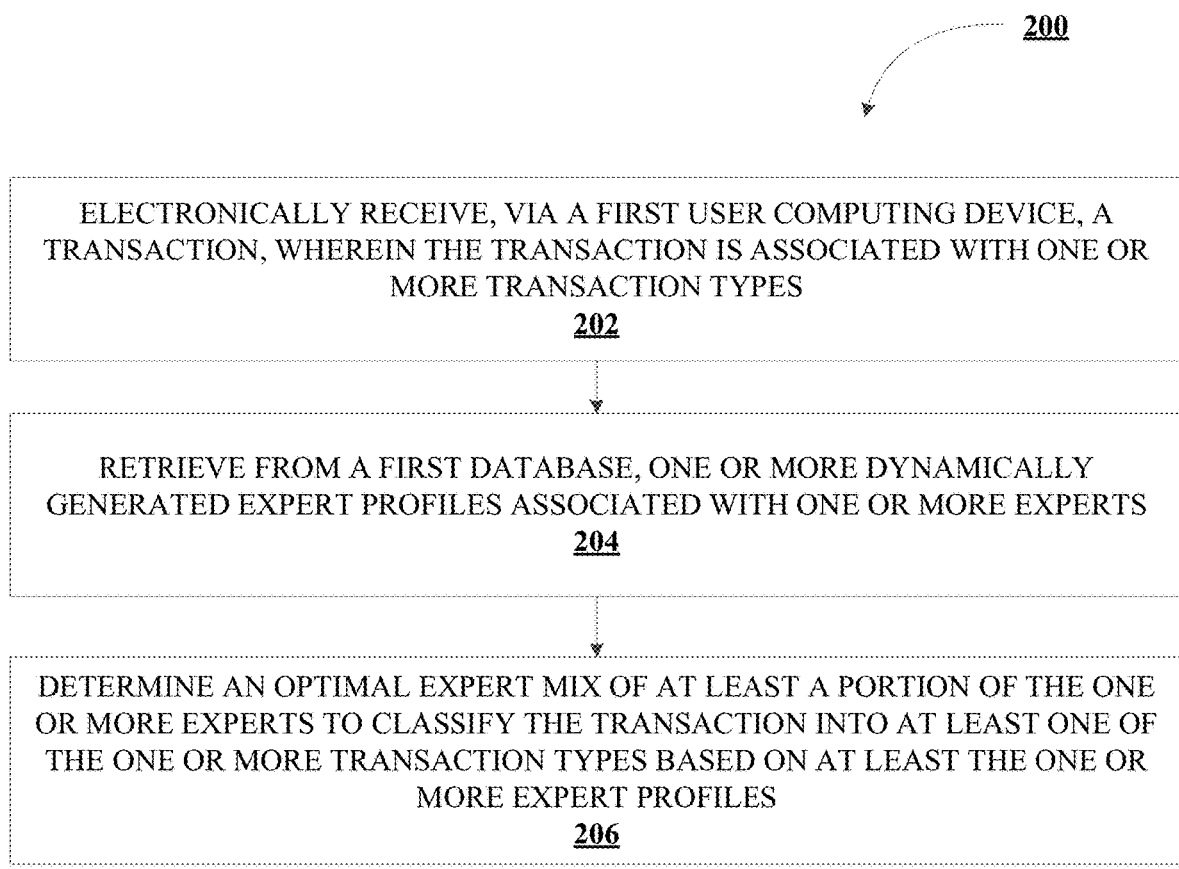
Figure 3:
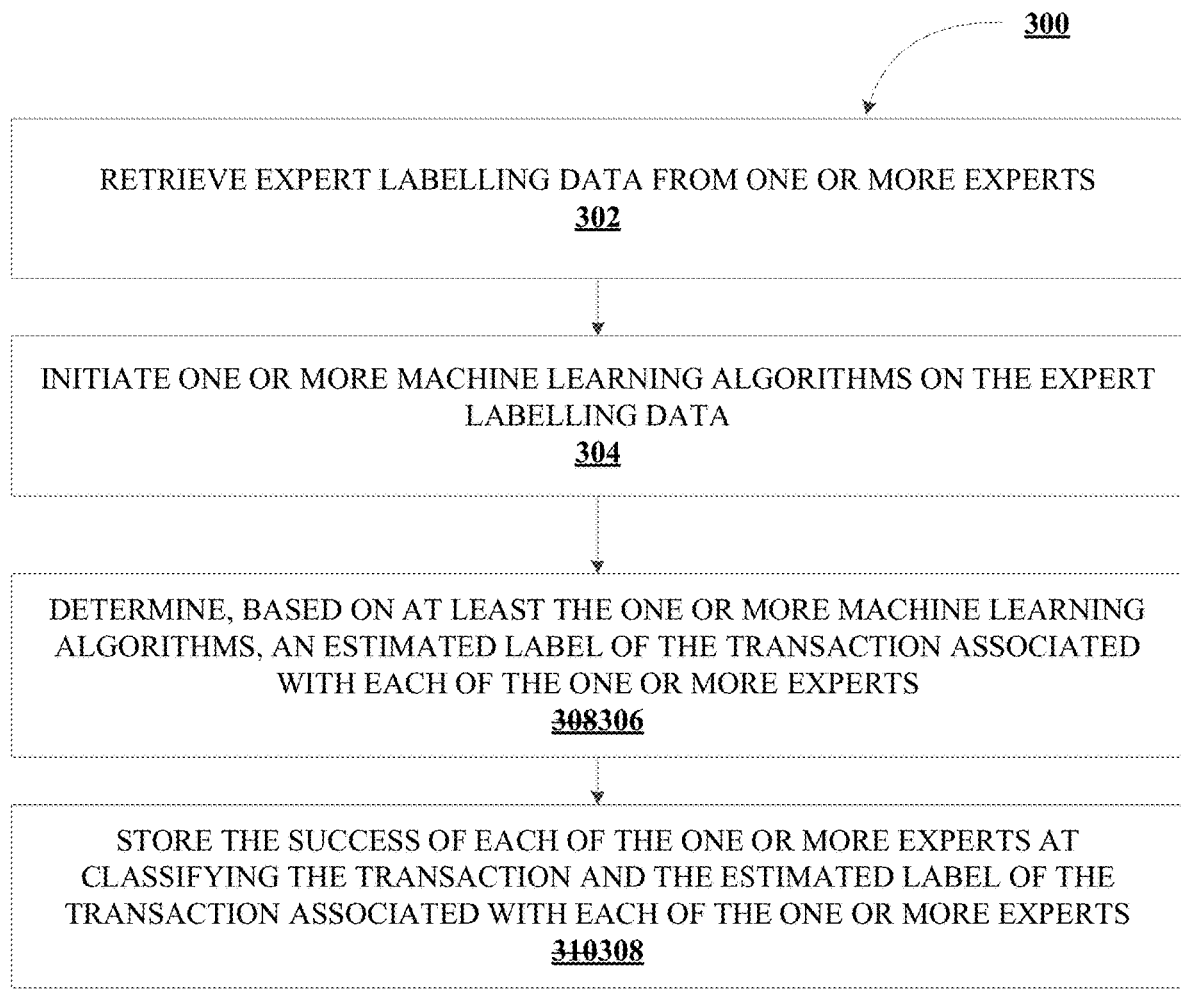

Having thus described embodiments of the invention in general terms, reference will now be made the accompanying drawings, wherein:

FIG. 1 presents an exemplary block diagram of the system environment for de-conflicting data labeling in real time deep learning systems, in accordance with an embodiment of the invention;

FIG. 2 illustrates a process flow for de-conflicting data labeling in real time deep learning systems, in accordance with an embodiment of the invention;

FIG. 3 illustrates a process flow for determining a predictive accuracy for one or more experts based on historical transaction information, in accordance with an embodiment of the invention; and FIG. 4 illustrates a machine learning environment associated with de-conflicting data labelling in real-time deep learning systems, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As used herein, a "user" may be an individual associated with an entity. In some embodiments, a "user" may be any individual capable of operating the systems described herein. In some embodiments, a "user" may be any individual, entity or system who has a relationship with the entity, such as a customer.

As used herein, an "expert" may be an employee (e.g., a subject matter expert, domain expert, a developer, a coder, an architect, an associate, a project manager, an IT specialist, a manager, an administrator, an internal operations analyst, or the like), one or more machine learning models, and/or external data sources of the entity or enterprises affiliated with the entity, capable of operating the systems described herein.

As used herein, a "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication information" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, to "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information.

The machine learning algorithms and models techniques used herein may include but are not limited to linear regression, logistic regression, neural networks, support vector machines, decision trees, and their derivatives. In practice, one technique can be used in the research effort to provide insights for another machine learning/modeling technique. Thus, a combination of techniques can be used in the analysis and in the product implementation. Once the machine learning algorithm/modeling structure and method is determined, the algorithm is trained based on a training dataset and the corresponding ground truth class label. The listing of machine learning/modeling structures and techniques listed herein are not exhaustive. Those skilled in the art will appreciate that other predictive modeling structures and techniques may be used in various embodiments. Example predictive modeling structures and techniques may include genetic algorithms, text classifiers, hidden Markov models, self-organizing maps, and dynamic Bayesian analysis.

The optimization techniques used herein may include but not limited to gradient descent algorithms and its derivatives such as Adagrad, RMSprop, Adam, Bayesian optimization, and/or the like. In practice, one technique can be used in the research effort to provide insights for another optimization technique. Thus, a combination of techniques can be used in the analysis and in the product implementation. The listing of optimization algorithms and techniques listed herein are not exhaustive. Those skilled in the art will appreciate that other optimization algorithms for training deep models may be used in various embodiments.

FIG. 1 presents an exemplary block diagram of the system environment for de-conflicting data labeling in real time deep learning systems 100. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute one or more applications stored thereon. The one or more applications may be configured to communicate with the system 130, perform a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth®, Wi-Fi®, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

An effective supervised learning methodology requires both a suitable training dataset and corresponding labels, tags, and annotations to train the machine-learning algorithm effectively. With the rise of automated feature generation techniques like deep learning, training data has become a major priority for a number of entities. Deep learning models have become omnipresent in the field of machine learning primarily because they automate the onerous task of selecting or engineering features. However, especially as they become deeper and more complex, and collecting this training data and assigning corresponding labels effectively has increasingly become challenging. While the onus is to move entities away from hand-labeling training data, in increasingly complex real-world application, assigning "ground truth" labels—a golden standard to which the machine learning models need to adapt—requires domain expertise. Machine learning techniques traditionally rely on "ground truth" as part of the model building process. Typically, ground truth refers to the accuracy of the training dataset's classification for supervised learning techniques. To effectively train the one or more machine learning algorithms, each record in the training dataset must be assigned a class label, i.e., ground truth. The quality of this class label is an important factor in the success of the machine learning models for supervised learning algorithms.

Large entities typically employ multiple users, typically authorities in their specific areas, to hand-label transactions as they receive them. Some entities employ one or more machine learning models, external data sources, and customer feedback, either singly or in combination with multiple users as experts to assign ground truth labels. Most transactions today are complex in nature. Inputs from multiple experts may be taken into consideration for ground truth. This involves receiving an input from each expert regarding the transaction type when assigning ground truth classification labels to each incoming transaction. In some cases, experts within the same entity may have conflicting inputs when assigning ground truth class labels. In some other cases, the ground truth class labels assigned to a transaction—even with expert consensus—may not accurately classify the transaction. In such situations, the developing training dataset will include mislabeled data affecting the overall machine learning system.

The present invention provides the functional benefit of developing an optimization technique to improve the selection of experts involved in the training data labelling process based on each of their expert profiles for improved performance in deep learning systems.

FIG. 2 illustrates a process flow for de-conflicting data labeling in real time deep learning systems 200, in accordance with an embodiment of the invention. As shown in block 202, the process flow includes electronically receiving via a first user computing device, a transaction, wherein the transaction is associated with one or more transaction types. In the context of example implementations described herein, a "transaction" may refer to any transfer of resources and/or an obligation to return resources to and/or from a user. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

In the context of example implementations described herein, a "transaction type" may include, but is not limited to a valid transaction and/or an unauthorized transaction. In some embodiments, a valid transaction may include additional transaction sub-types including but not limited to, payment/sale/debit, credit/refund, authorization, delayed capture, void, voice authorization, settlement, pre-not, and/or the like. In some other embodiments, an unauthorized transaction may include additional transaction sub-types including but not limited to, chargebacks, identity misrepresentation, transaction based on unauthorized use of financial instruments, use of unauthorized device to conduct transactions, other unauthorized e-commerce transactions, and/or the like.

Next, as shown in block 204, the process flow includes retrieving from a first database, one or more dynamically generated expert profiles associated with one or more experts. In some embodiments, the one or more expert profiles includes at least a predictive accuracy of the one or more experts based on the success rate of the one or more experts at classifying the transaction, shared information metrics, divergence metrics, expert characteristics, an exposure score associated, and information associated with the transaction. To retrieve the expert profiles, the system may be configured to initiate a data retrieval subroutine including a sequence of system-specific program instructions to retrieve the expert profiles from the database. In one aspect, these program instructions may be defined within one or more applications installed in the system 130 and/or the user input system 140, or separately in libraries capable of being used by many applications.

Next, as shown in block 206, the process flow includes determining an optimal expert mix of at least a portion of the one or more experts to classify the transaction into at least one of the one or more transaction types based on at least the one or more expert profiles. Each expert's authority in a particular area of topic may vary. For example, a first expert may have more experience in classifying unauthorized transactions related to identity misrepresentations, while a second expert may have less experience in classifying unauthorized transactions related to identity misrepresentations, but has more experience classifying transactions related to use of unauthorized device to conduct transactions. Accordingly, the first expert may have a higher prediction accuracy in classifying unauthorized transactions related to identity misrepresentations, while the second expert may have higher accuracy in classifying transactions related to use of unauthorized device to conduct transactions correctly. Some transactions may require an expert who has subject matter expertise in multiple areas or topics. By selecting at least a portion of the one or more experts based on their expert profiles, the present invention provides the functional benefit of increasing the likelihood of predicting the correct classification label for each transaction.

In some embodiments, the optimal expert mix includes, but is not limited to, a best expert for classifying the transaction, a combination score from at least the portion of the one or more experts evaluating the transaction simultaneously, and a sequence of at least the portion of the one or more experts analyzing the transaction. The example embodiments and implementations of the invention transforms the process of determining an optimal expert mix of at least a portion of the one or more experts into an optimization problem. In this regard, the system may be configured to implement one or more optimization algorithms on the one or more expert profiles to select an optimal expert mix of experts from a set of available alternatives. To this extent, the system may be configured to maximize a probability of accurately classifying the transaction into at least one of the one or more transaction types. In one aspect, this involves determining one or more weights for each expert from within an allowed set of weights when determining the optimal expert mix. In some embodiments, the combination of the one or more weights is dynamically learned and customized based on the transaction in a probabilistic manner. This custom optimization based on a combination of weights takes into consideration the profile of the contributing parties, i.e., expert profiles, which are learning by a deep learning solution such as a neural network.

In some embodiments, in response to determining the optimal expert mix, the system may be configured to transmit control signals configured to communicate to one or more devices associated with at least the portion of the one or more experts, a request to assign a classification label to the transaction. In response, the system may be configured to receive one or more classification labels from at least the portion of the one or more experts to classify the transaction. In some embodiments, the one or more classification labels may include a reason code, a confidence score, and additional information to other experts. In some embodiments, the system may be configured to implement bi-clustering techniques to determine a group of expert inputs for each transaction. Once the classification labels are received, the system may then be configured to apply the one or more weights to each of the one or more classification labels received from at least the portion of the one or more experts. In response to applying the one or more weights, the system may be configured to determine the classification label to classify the transaction into at least one of the one or more transaction types or transaction sub-types based on at least a weighted function of the one or more classification labels received from at least the portion of the one or more experts. In one example, the weighted function may involve a canonical correlation analysis where the system may be configured to determine a linear combination of the weights and the classification labels which have maximum correlation with each other. Those skilled in the art will appreciate that other weighted functions and techniques may be used in various embodiments.

FIG. 3 illustrates a process flow for determining the success rate of each of the one or more experts in assigning a ground truth class label to one or more historical transactions and an estimated label of the transaction associated with each of the one or more experts 300, in accordance with an embodiment of the invention. As shown in block 302, the process flow includes retrieving expert labelling data from one or more experts. In this regard, the system may be configured to receive one or more historical transactions that have been classified by the one or more experts into one or more transaction types. These historical transactions may include historical classification labels assigned by the expert and the corresponding true classification label indicating a ground truth associated with the historical transaction.

In some embodiments, the system may be configured to determine a success rate of each of the one or more experts at classifying the one or more transactions into at least one of the one or more transaction types using one or more class labels, i.e., accuracy with which the expert assigns a class label to training data. In this regard, the system may be configured to determine one or more true classification labels indicating a ground truth associated with the one or more historical transactions, and compare the one or more true classification labels with the one or more historical classification labels received from the one or more experts to determine a match. Based on this comparison, the system may be configured to determine the success rate of each of the one or more experts at classifying the one or more transactions into at least one of the one or more transaction types using one or more class labels.

Next, as shown in block 304, the process flow includes initiating one or more machine learning algorithms, such as neural networks, on the expert labelling data. In doing so, the system may be configured to establish correlations between the historical transactions and historical classification labels assigned by the experts. Depending on the size and structure of the expert labelling data, the system may be configured to establish correlations between classification labels assigned to historical transactions and classification labels assigned to future transactions.

Next, as shown in block 306, the process flow includes determining, based on at least the one or more machine learning algorithms, an estimated label of the transaction from each of the one or more experts. In this regard, the system may be configured to predict, from the expert labelling data and the success rate of the experts, the estimated label of the transaction. In response to determining the success rate and the estimated label, the process flow includes storing the success rate and the estimated label as part of the expert profile, as shown in block 308.

In some embodiments, the system may be configured to update the one or more expert profiles incrementally in real-time. This includes updating the performance metrics, i.e., success rate of each of the one or more experts, of predictive accuracy associated with each of the one or more experts by calculating the false positives for each transaction. To this extent, the system may be configured to continuously determine whether the one or more classification labels received from the one or more experts matches a ground truth associated with one or more future transactions incrementally. In response, the system may be configured to update the success rate of each of the one or more experts at classifying the one or more future transactions.

In some embodiments, the system may be configured to transfer control signals configured to initiate one or more reporting subroutines on the one or more historical transactions, the one or more historical classification labels associated with the one or more historical transactions received from the one or more experts, at least one of the one or more transaction types or sub-types associated with the one or more historical transactions, and the predictive accuracy associated with each of the one or more experts. In response, the system may the configured to generate, using the one or more reporting subroutines, one or more dashboards comprising a graphical representation indicating a first portion of the one or more historical transactions of the one or more historical transactions misclassified by the one or more experts. In some embodiments, the system may be configured to generate a unique dashboard for each expert based on their inputs to classify historical transactions.

In some other embodiments, the system may be configured to transfer control signals configured to initiate one or more reporting subroutines on each transaction analyzed by the one or more experts to provide a real-time feedback for improved performance.

FIG. 4 illustrates a machine learning environment associated with de-conflicting data labelling in real-time deep learning systems 400, in accordance with an embodiment of the invention. The machine learning environment includes exposure analysts (1-N), claim analysts (1-M), machine learning models (1-K), and other rules and strategies 430, which are the experts involved in establishing ground truth, the system 130, a user computing system 130 capable of interacting with the system 140 to communicate the transaction to the system 140. As described, the system 140 may be configured for dynamically profiling and incremental learning of the expert strengths per transaction type, provide a feedback loop on the display/assignment of alerts/transactions, provide feedback on individual expert performance towards improved performance, and select model and analyst teams to work on alerts/transactions for optimal performance.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java®, Perl®, Smalltalk, C++, SAS, SQL, Python®, Objective C, JavaScript®, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for de-conflicting data labeling in real-time deep learning systems, the system comprising:

at least one non-transitory storage device; and
   at least one processing device coupled to the at least one non-transitory storage device, wherein the at least one processing device is configured to:

electronically receive, via a first user computing device, a transaction, wherein the transaction is associated with one or more transaction types;

retrieve from a first database, one or more dynamically generated expert profiles associated with one or more experts, wherein the one or more experts are subject matter experts in the one or more transaction types, wherein dynamically generating the one or more expert profiles comprises:

retrieving expert labelling data from one or more experts;

determining a success rate of the one or more experts indicating an accuracy of assigning one or more historical classification labels for one or more historical transactions;

training a machine learning model using the expert labelling data and the success rate of the one or more experts;

determining, using the trained machine learning model, one or more estimated labels for the transaction from the one or more experts; and storing the one or more estimated labels for the transaction and the corresponding success rate of the one or more experts in the one or more expert profiles;

determine an optimal expert mix of at least a portion of the one or more experts to classify the transaction into at least one of the one or more transaction types based on at least the one or more expert profiles, wherein determining further comprises maximizing a probability of accurately classifying the transaction into at least one of the one or more transaction types using one or more optimization algorithms, wherein the optimal expert mix comprises: (i) a best expert for classifying the transaction, (ii) a combination score from at least the portion of the one or more experts evaluating the transaction simultaneously, and (iii) a sequence of at least the portion of the one or more experts analyzing the transaction;

determine one or more weights associated with the optimal expert mix of at least the portion of the one or more experts;

receive one or more classification labels from the optimal expert mix of at least the portion of the one or more experts to classify the transaction, wherein the one or more classification labels comprises a reason code, a confidence score, and additional information to at least the portion of the one or more experts associated with the optimal expert mix;

update the one or more expert profiles of at least the portion of the one or more experts, wherein updating further comprises replacing the one or more estimated labels with the one or more classification labels;

apply the one or more weights to each of the one or more classification labels received from the optimal expert mix of at least the portion of the one or more experts; and determine the classification label to classify the transaction into at least one of the one or more transaction types based on at least a weighted function of the one or more classification labels received from the optimal expert mix of at least the portion of the one or more experts.

2. The system of claim 1, wherein the weighted function comprises a canonical correlation analysis to determine a linear combination of the one or more weights and the one or more classification labels received from at least the portion of the one or more experts which have maximum correlation with each other.

3. The system of claim 1, wherein the at least one processing device is further configured to determine the success rate of each of the one or more experts, wherein determining further comprises:

electronically receive the one or more historical transactions, wherein the one or more historical transactions is associated with the one or more transaction types;

electronically receive from the one or more experts, the one or more historical classification labels associated with the one or more historical transactions classifying the one or more historical transactions into at least one of the one or more transaction types;

determine one or more true classification labels indicating a ground truth associated with the one or more historical transactions;

compare the one or more true classification labels with the one or more historical classification labels received from the one or more experts to determine a match; and determine the success rate of each of the one or more experts based on at least based on at least comparing the one or more true classification labels with the one or more historical classification labels.

4. The system of claim 3, wherein the at least one processing device is further configured to:

transfer control signals configured to initiate one or more reporting subroutines on the one or more historical transactions, the one or more historical classification labels associated with the one or more historical transactions received from the one or more experts, at least one of the one or more transaction types associated with the one or more historical transactions, and the success rate of each of the one or more experts at accurately classifying the one or more historical classification labels; and generate, using the one or more reporting subroutines, one or more dashboards comprising a graphical representation indicating a first portion of the one or more historical transactions accurately classified by the one or more experts and a second portion of the one or more historical transactions misclassified by the one or more experts.

5. The system of claim 1, wherein the one or more expert profiles comprises: (i) shared information metrics, (ii) divergence metrics, (iii) characteristics associated with the one or more experts, (iv) a predictive accuracy of the one or more experts based on a success rate of the one or more experts at classifying the transaction, (v) an exposure score associated with the one or more experts, and (vi) information associated with the transaction.

6. The system of claim 1, wherein the at least one processing device is further configured to update the one or more expert profiles in real-time, wherein updating further comprises updating the success rate of each of the one or more experts at classifying the one or more historical classification labels.

7. The system of claim 6, wherein updating the one or more expert profiles in real-time further comprises:
continuously determining whether the one or more classification labels received from the one or more experts matches a ground truth associated with one or more future transactions incrementally; and
updating the success rate of each of the one or more experts at classifying the one or more future transactions.

8. The system of claim 1, wherein the one or more transaction types comprises at least a valid transaction and an unauthorized transaction, and wherein the unauthorized transaction comprises one or more unauthorized transaction types.

9. The system of claim 1, wherein the one or more experts comprises one or more machine learning models, one or more human analysts, a customer feedback, and/or one or more external data sources.

10. A computer implemented method for de-conflicting data labeling in real-time deep learning systems, the method comprising:
electronically receiving, via a first user computing device, a transaction, wherein the transaction is associated with one or more transaction types;
retrieving from a first database, one or more dynamically generated expert profiles associated with one or more experts, wherein the one or more experts are subject matter experts in the one or more transaction types, wherein dynamically generating the one or more expert profiles comprises:
retrieving expert labelling data from one or more experts;
determining a success rate of the one or more experts indicating an accuracy of assigning one or more historical classification labels for one or more historical transactions;
training a machine learning model using the expert labelling data and the success rate of the one or more experts;
determining, using the trained machine learning model, one or more estimated labels for the transaction from the one or more experts; and
storing the one or more estimated labels for the transaction and the corresponding success rate of each of the one or more experts in the one or more expert profiles;
determining an optimal expert mix of at least a portion of the one or more experts to classify the transaction into at least one of the one or more transaction types based on at least the one or more expert profiles, wherein determining further comprises maximizing a probability of accurately classifying the transaction into at least one of the one or more transaction types using one or more optimization algorithms, wherein the optimal expert mix comprises: (i) a best expert for classifying the transaction, (ii) a combination score from at least the portion of the one or more experts evaluating the transaction simultaneously, and (iii) a sequence of at least the portion of the one or more experts analyzing the transaction;
determining one or more weights associated with the optimal expert mix of at least the portion of the one or more experts;
receiving one or more classification labels from the optimal expert mix of at least the portion of the one or more experts to classify the transaction, wherein the one or more classification labels comprises a reason code, a confidence score, and additional information to at least the portion of the one or more experts associated with the optimal expert mix;
updating the one or more expert profiles of at least the portion of the one or more experts, wherein updating further comprises replacing the one or more estimated labels with the one or more classification labels;
applying the one or more weights to each of the one or more classification labels received from the optimal expert mix of at least the portion of the one or more experts; and
determining the classification label to classify the transaction into at least one of the one or more transaction types based on at least a weighted function of the one or more classification labels received from the optimal expert mix of at least the portion of the one or more experts.

11. The method of claim 10, wherein the weighted function comprises a canonical correlation analysis to determine a linear combination of the one or more weights and the one or more classification labels received from at least the portion of the one or more experts which have maximum correlation with each other.

12. The method of claim 10, wherein determining the success rate of each of the one or more experts further comprises:
electronically receiving the one or more historical transactions, wherein the one or more historical transactions is associated with the one or more transaction types;
electronically receiving from the one or more experts, the one or more historical classification labels associated with the one or more historical transactions classifying the one or more historical transactions into at least one of the one or more transaction types;
determining one or more true classification labels indicating a ground truth associated with the one or more historical transactions;
comparing the one or more true classification labels with the one or more historical classification labels received from the one or more experts to determine a match; and
determining the success rate of each of the one or more experts based on at least based on at least comparing the one or more true classification labels with the one or more historical classification labels.

13. The method of claim 12, wherein the method further comprises:

transferring control signals configured to initiate one or more reporting subroutines on the one or more historical transactions, the one or more historical classification labels associated with the one or more historical transactions received from the one or more experts, at least one of the one or more transaction types associated with the one or more historical transactions, and the success rate of each of the one or more experts at accurately classifying the one or more historical classification labels; and generating, using the one or more reporting subroutines, one or more dashboards comprising a graphical representation indicating a first portion of the one or more historical transactions accurately classified by the one or more experts and a second portion of the one or more historical transactions misclassified by the one or more experts.

14. The method of claim 10, wherein the method further comprises updating the one or more expert profiles in real-time, wherein updating further comprises updating the success rate of each of the one or more experts at classifying the one or more historical classification labels.

15. The method of claim 14, wherein updating the one or more expert profiles in real-time further comprises:
continuously determining whether the one or more classification labels received from the one or more experts matches a ground truth associated with one or more future transactions incrementally; and
updating the success rate of each of the one or more experts at classifying the one or more future transactions.

16. A computer program product for de-conflicting data labeling in real-time deep learning systems, the computer program product comprising a non-transitory computer-readable medium comprising code causing an apparatus to:
electronically receive, via a first user computing device, a transaction, wherein the transaction is associated with one or more transaction types;
retrieve from a first database, one or more dynamically generated expert profiles associated with one or more experts, wherein the one or more experts are subject matter experts in the one or more transaction types, wherein dynamically generating the one or more expert profiles comprises:
retrieving expert labelling data from one or more experts;
determining a success rate of the one or more experts indicating an accuracy of assigning one or more historical classification labels for one or more historical transactions;
training a machine learning model using the expert labelling data and the success rate of the one or more experts;
determining, using the trained machine learning model, one or more estimated labels for the transaction from the one or more experts; and
storing the one or more estimated labels for the transaction and the corresponding success rate of the one or more experts in of the one or more expert profiles;
determine an optimal expert mix of at least a portion of the one or more experts to classify the transaction into at least one of the one or more transaction types based on at least the one or more expert profiles, wherein determining further comprises maximizing a probability of accurately classifying the transaction into at least one of the one or more transaction types using one or more optimization algorithms, wherein the optimal expert mix comprises: (i) a best expert for classifying the transaction, (ii) a combination score from at least the portion of the one or more experts evaluating the transaction simultaneously, and (iii) a sequence of at least the portion of the one or more experts analyzing the transaction;
determine one or more weights associated with the optimal expert mix of at least the portion of the one or more experts;
receive one or more classification labels from the optimal expert mix of at least the portion of the one or more experts to classify the transaction, wherein the one or more classification labels comprises a reason code, a confidence score, and additional information to at least the portion of the one or more experts associated with the optimal expert mix;
update the one or more expert profiles of at least the portion of the one or more experts, wherein updating further comprises replacing the one or more estimated labels with the one or more classification labels;
apply the one or more weights to each of the one or more classification labels received from the optimal expert mix of at least the portion of the one or more experts; and
determine the classification label to classify the transaction into at least one of the one or more transaction types based on at least a weighted function of the one or more classification labels received from the optimal expert mix of at least the portion of the one or more experts.

* * * * *